(12) United States Patent
Ryu

(10) Patent No.: US 12,164,380 B2
(45) Date of Patent: Dec. 10, 2024

(54) TWO-PHASE BYZANTINE CONSENSUS METHOD AND SYSTEM FOR STATE MACHINE REPLICATION

(71) Applicant: IUCF-HYU (INDUSTRY-UNIVERSITY COOPERATION FOUNDATION HANYANG UNIVERSITY), Seoul (KR)

(72) Inventor: Minsoo Ryu, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/087,910

(22) Filed: Dec. 23, 2022

(65) Prior Publication Data

US 2024/0118972 A1 Apr. 11, 2024

(30) Foreign Application Priority Data

Oct. 5, 2022 (KR) .................. 10-2022-0127135

(51) Int. Cl.
 *G06F 11/14* (2006.01)
 *G06F 9/54* (2006.01)

(52) U.S. Cl.
 CPC .......... *G06F 11/1415* (2013.01); *G06F 9/546* (2013.01)

(58) Field of Classification Search
 CPC .............................. G06F 11/1415; G06F 9/546
 USPC ........................................................... 714/15
 See application file for complete search history.

(56) References Cited

U.S. PATENT DOCUMENTS

| 6,931,431 B2 | 8/2005 | Cachin et al. |
| 2012/0254412 A1* | 10/2012 | Goose ................. G06F 9/5072 709/224 |
| 2020/0310901 A1* | 10/2020 | Yang .................. G06F 11/0709 |

FOREIGN PATENT DOCUMENTS

| EP | 3 607 733 A2 | 2/2020 |
| KR | 10-2020-0112635 A | 10/2020 |
| KR | 10-2020-0144466 A | 12/2020 |
| KR | 10-2022-0091850 A | 7/2022 |

OTHER PUBLICATIONS

Extended European Search Report dated Aug. 25, 2023 in European Application No. 22216034.3.
Rong Yingyao et al., "COMBFT: Conflicting-Order-Match based Byzantine Fault Tolerance Protocol with High Efficiency and Robustness", ICPP, 2019, pp. 1-10 (10 pages total).
Korean Office Action dated May 27, 2024 in Application No. 10-2022-0127135.

* cited by examiner

*Primary Examiner* — Yair Leibovich
(74) *Attorney, Agent, or Firm* — Sughrue Mion, PLLC

(57) ABSTRACT

The present disclosure relates to a two-phase Byzantine consensus method and system for state machine replication. A consensus method which is performed by a consensus system includes performing, by all of normal processes, consensus for a sequence number proposed by a process designated to be primary with respect to a client request according to an agreement protocol; and replacing the primary when the primary is suspicious of having a Byzantine fault according to a view change protocol.

16 Claims, 11 Drawing Sheets

TWO-PHASE BYZANTINE CONSENSUS METHOD AND SYSTEM FOR STATE MACHINE REPLICATION

CROSS-REFERENCES TO RELATED APPLICATIONS

This application is based on and claims priority under 35 U.S.C. 119 to Korean Patent Application No. 10-2022-0127135, filed on Oct. 5, 2022 in the Korean intellectual property office, the disclosures of which are herein incorporated by reference in their entireties.

TECHNICAL FIELD

The following description relates to a consensus algorithm which may be applied to state machine replication while permitting a Byzantine fault.

BACKGROUND OF THE DISCLOSURE

The goal of consensus is to reach an agreement among multiple processes. Consensus is a fundamental problem in many distributed applications such as state machine replication, distributed database management, atomic broadcast, blockchain, etc. Among them, state machine replication is the most fundamental application in which all non-faulty processes maintain the same internal state and produce the same output by executing client requests in the same order. Due to its general nature, a consensus algorithm for state machine replication can be applied to many other applications including distributed database management systems and blockchains.

There are two noticeable consensus algorithms. Practical Byzantine Fault Tolerance (PBFT) proposed in Operating Systems Design and Implementation (OSDI) symposium in 1999 is a Byzantine consensus algorithm for state machine replication. PBFT has been widely used because it significantly improves the communication cost from the exponential level to the polynomial level when compared to previous Byzantine consensus algorithms. PBFT uses three communication phases including two all-to-all communication phases, which, unfortunately, limits its scalability to applications involving only a small number of processes. Another consensus algorithm, Zyzzyva proposed in Symposium on Operating Systems Principles (ACM SOSP) symposium in 2007, is a speculative method that uses only one communication phase in a normal case. However, if there exist any single faulty process or some network delay, Zyzzyva switches to a slower four-phase algorithm that has a communication pattern similar in principle to that of PBFT. Furthermore, if a leader process, called primary, is Byzantine faulty, the states of processes may diverge indefinitely and such inconsistency can be detected and eliminated only with the help of clients.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a Byzantine fault tolerant consensus method for state machine replication. The consensus method leverages speculation to reach agreement in two communication phases, and thereby improves the latency and throughput of existing non-speculative algorithms that use three or more communication phases. The proposed consensus method also offers better practical performance than Zyzzyva that has to run a four-phase algorithm even when there exists only one faulty process. Furthermore, the proposed consensus method ensures that inconsistency among process states is bounded and detectable without a client intervention.

The consensus method consists of an agreement protocol by which all non-faulty processes agree on a sequence number proposed by a primary and a view change protocol by which a primary suspected to be Byzantine faulty is replaced with other process.

The agreement protocol allows processes to reach agreement in two communication phases. In the first phase, the primary assigns a sequence number to a client request and multicasts a PREPARE message to all the processes. In the second phase, each process multicasts a EXECUTE message to all the processes and executes the client request when it receives matching EXECUTE messages from a supermajority, more than two thirds, of the processes including itself. Unlike Zyzzyva, the agreement protocol operates in two phases even when there exist faulty processes or some network delay, and thereby improves the overall performance, scalability, and robustness of the systems that make use of it.

The view change protocol provides liveness when a primary fails. If a primary fails, processes will indefinitely wait for requests to execute. To avoid such indefinite waiting, each process uses a timer. If the timer of a process expires, the process determines a new view value to designate a new primary and multicasts a PROPOSE-NEW-VIEW message to all the processes. When the process designated by the new view value receives valid PROPOSE-NEW-VIEW messages from a supermajority of the processes, it starts to operate as the primary in the new view by multicasting an ACCEPT-NEW-VIEW message to all other processes.

The present disclosure may introduce temporarily inconsistent process states. It allows non-faulty processes to agree on a single total order for client requests within the same view, but different non-faulty processes may execute different client requests at the same sequence number in different views. In general, it is impossible to completely eliminate such inconsistency without running an expensive three-phase algorithm. However, the proposed two-phase consensus method ensures bounded and detectable inconsistency by using the notion of execution history. To this end, each process maintains an execution history, an ordered list of the client requests that have been executed by the process, in the form of cryptographic hash value, and checks if its execution history is consistent with other execution histories when communicating with other processes. This allows for bounded inconsistency in the sense that only the most recent execution of a client request can be inconsistent with the execution history of a supermajority of the processes. The use of execution histories also enables processes to detect inconsistency without a client intervention.

Furthermore, in order to avoid inconsistency as much as possible, the view change protocol uses a speculative carryover. During a view change, a new primary attempts to find and carryover a client request from the previous view that might have been executed by some number of processes less than a supermajority. Unless the new primary carries over such a client request to the new view, processes might execute a different client request at the same sequence number in the new view. Unfortunately, the new primary may discover more than one such client requests when there exist Byzantine faulty processes. In this case, only one client request has been executed by non-faulty processes since they require matching EXECUTE messages from a super-majority of processes. But the new primary cannot distinguish the right client request from others and might choose a wrong client request causing inconsistency in the new view. However, it is better than not doing it since inconsistency will still happen without the speculation.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
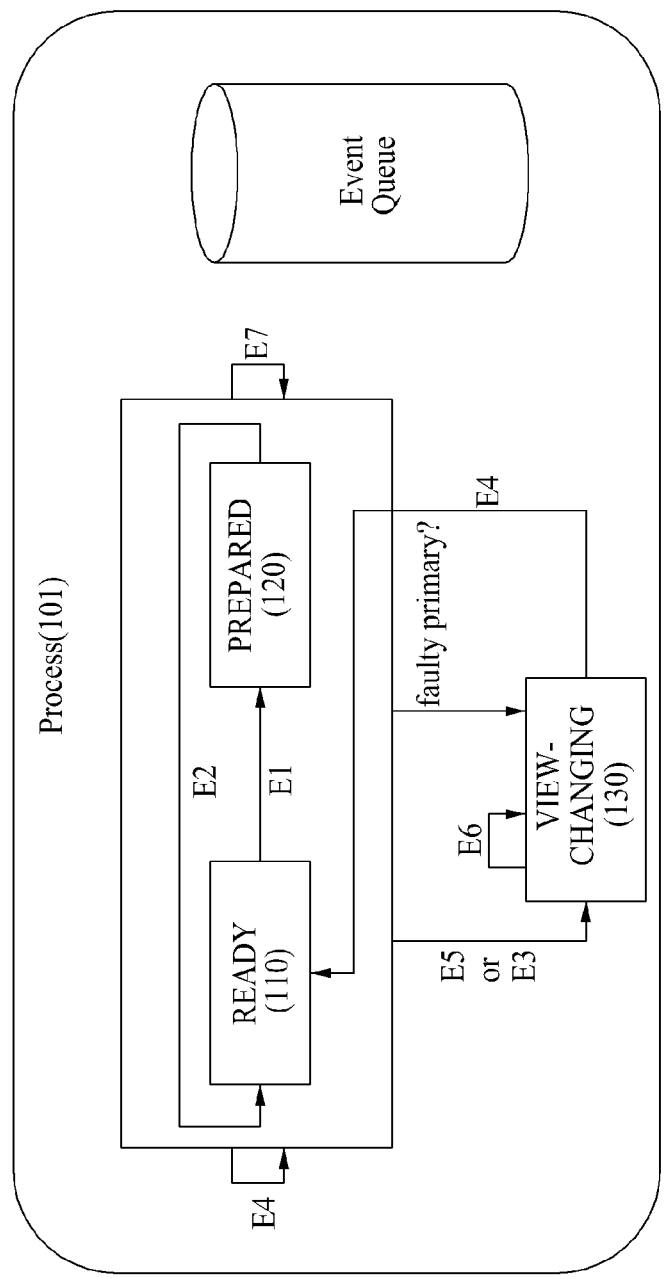
FIG. 1 is a diagram for describing a state diagram with respect to a consensus method and event queue of a process in an embodiment.

While illustrative embodiments have been illustrated and described, it will be appreciated that various changes can be made therein without departing from the spirit and scope of the disclosure.

Hereinafter, embodiments are described in detail with reference to the accompanying drawings.

In order to describe a two-phase Byzantine consensus operation for state machine replication that is proposed in an embodiment, an execution environment, a model, an assumption, and properties are first described.

The execution environment for consensus that is proposed in an embodiment may include n (n is a natural number) processes that are considered as state machines and clients that request a query or update operation from the processes. An object of state machine replication is that non-faulty processes output the same result (i.e., output) with respect to all of client requests while maintaining the same state. To this end, the non-faulty processes need to execute the client requests in the same order.

In a consensus operation that is proposed in an embodiment, one process is determined to be primary, and the primary receives a client request and proposes a sequence number to the remaining processes. The processes determine the sequence number proposed by the primary through consensus, execute the client request at the determined order, and transmit a result of the execution to a client.

In general, in a consensus problem, two conditions for safety and liveness need to be satisfied. Safety means a condition in which "when a request m from a non-faulty client is committed at a sequence number n, another request m' is not committed at the same sequence number n and the same request m should not be committed again at another sequence number n'." Liveness means a condition in which a request m from a non-faulty client should be eventually committed.

An embodiment may be applied to a system that operates synchronously or asynchronously. The synchronous system refers to a system in which an upper bound for the time taken to transmit a message and the processing time of a process is present and known. The asynchronous system refers to a system in which an upper bound for the time taken to transmit a message and the processing time of a process is not present. A message may be redundantly transmitted or the order that a message arrives may be changed.

A consensus operation that is proposed in an embodiment guarantees safety for both the synchronous or asynchronous systems, and guarantees liveness if a system operates synchronously for a sufficient time.

In an embodiment, a Byzantine fault of a process and a client is permitted. The Byzantine fault means all types of faults that violate a rule determined in a consensus algorithm in addition to a fail-stop fault in which execution is stopped. In order for a consensus operation that is proposed in an embodiment to correctly operate, a Byzantine fault needs to occur in f or less processes. In this case, n needs to be equal to or greater than 3f+1. In an embodiment, n=3f+1 is assumed. Furthermore, in an embodiment, a Byzantine fault of clients is permitted. Byzantine clients may affect a consensus speed, but does not affect safety and liveness.

In an embodiment, a section in which consensus is performed is divided into a view and a round. The view means a section in which one primary performs consensus. The round means a section in which one client request is agreed and executed. One view may include several rounds.

If the primary is suspicious of having a Byzantine fault, a view may be changed. To change the view has the same meaning that the primary is replaced with another process, which is called a view change. A method of determining a new primary is various. In an embodiment, processes are distinguished by using identifiers i. A primary of a k-th view is determined as a process i such that k=i % n.

In an embodiment, a protocol may include two sub-protocols. One of the two sub-protocols is an agreement protocol that processes consensus and execution for a client request. The other of the two sub-protocols is a view change protocol that replaces the primary that is suspicious of having a Byzantine fault.

Prior to a description of a consensus operation that is proposed in an embodiment, variables and timers that are used by processes are defined as follows.

currentView indicates a current view value. Each process i sets currentView$_i$=1 as an initial value.

currentState indicates a current state of a process, and has one value of READY, PREPARED, and VIEW-CHANGING. Each process i sets currentState$_i$=READY as an initial value.

executeIndex indicates a sequence number of a client request that has been most recently executed by a process. Each process i sets executeIndex$_i$=0 as an initial value.

executeLog indicates a list of client request messages that has been executed by a process. Each process i sets executeLog$_i$[0]=null as an initial value. If a client request message that has been executed at a k-th place by the process i is $m_{i,k}$, executeLog$_i$[k]=$m_{i,k}$.

executeHistory indicates a summarized history of client request messages executed by a process by using a cryptographic hash function Hash( ). executeHistory$_i$[0]=0 is set as an initial value of each process i, and execute History$_i$[k]=Hash(executeHistory$_i$[k−1], $m_{i,k}$). Since the cryptographic hash function used has sufficient collision resistance, it is assumed that the probability that hash function values of different inputs are identical with each other is 0. Accordingly, if two processes have the same executeHistory, this means that the two processes have executed the same client requests so far in the same order.

replyLog indicates a list of messages that have been replied from a process to a client. replyLog$_i$[0]=null is set as an initial value of each process i. In a process $P_i$ if a message that has been replied at a k-th place is $R_{i,k}$, replyLog$_i$[k]=undoLog indicates a set of pieces of information that is necessary for a process to undo a client request that has most recently been executed. Each process i needs to record pieces of information necessary for undoLog; before executing a client request.

reservedPrepare indicates a client request message m that needs to be carried over to a new view by a newly selected primary p. If such a client request message is not present, reservedPreparep=null is set.

deferredExecution is a bool variable that is used when the execution of a client request is deferred if the execution of the client request task is impossible or a rollback cost is too high. deferredExecution$_i$=false is set as an initial value of each process i, and deferredExecution$_i$=true is set when the execution of a client request is deferred.

An agreement timer $T_{agreement}$ indicates a timer that is used to determine whether consensus is smoothly performed. Each process i initializes $T_{agreement}$, i as a value $\Delta_1$ whenever the process starts consensus for a new client request. When the timer expires, the replacement of the primary is attempted through a view change.

A view-change timer $T_{view-change}$ indicates a timer that is used to determine whether a view change is smoothly performed. Each process i initializes $T_{view-change}$, i as a value $\Delta 2$ when the process first starts a view change, and increases a new view value by 1 and increases a timer value twice whenever the timer expires.

FIG. 1 is a diagram for describing a state diagram with respect to a consensus method and event queue of a process in an embodiment.

FIG. 1 is a diagram illustrating a process in the form of software or hardware based on a state diagram and event queue of a process 101. The process 101 may have three states of READY 110, PREPARE 120, and VIEW-CHANGING 130. The process may perform a state transition and an operation defined in an algorithm depending on seven types of events. All the events may be stored in an event queue right after the event occurs. The process 101 repeats an event processing loop in which an event is taken out from the event queue one by one and executed whenever a state transition is completed.

Table 1 is a table illustrating events.

| Event | Symbol | Meaning |
|---|---|---|
| E1 | Receive PREPARE message | E5 | Agreement timer $T_{agreement}$ expires |
| E2 | Receive (2f + 1) EXECUTE messages | E6 | View-change timer $T_{view-change}$ expires |
| E3 | Receive (f + 1) PROPOSE-NEW-VIEW messages | E7 | Receive a message re-transmitted by a client |
| E4 | Receive ACCEPT-NEW-VIEW message | | |

The process 101 stores, in the event queue, all of valid events that occur regardless of a state of the process 101, and may neglect an invalid event without storing the invalid event in the event queue. Exceptionally, the process 101 may store, in the event queue, an event that is necessary to determine a Byzantine fault of the primary among invalid events. For example, an invalid PREPARE message means a Byzantine fault of the primary. When a PREPARE message is received, the received PREPARE message is stored in the event queue so that a view-change is subsequently started.

Figure 2:
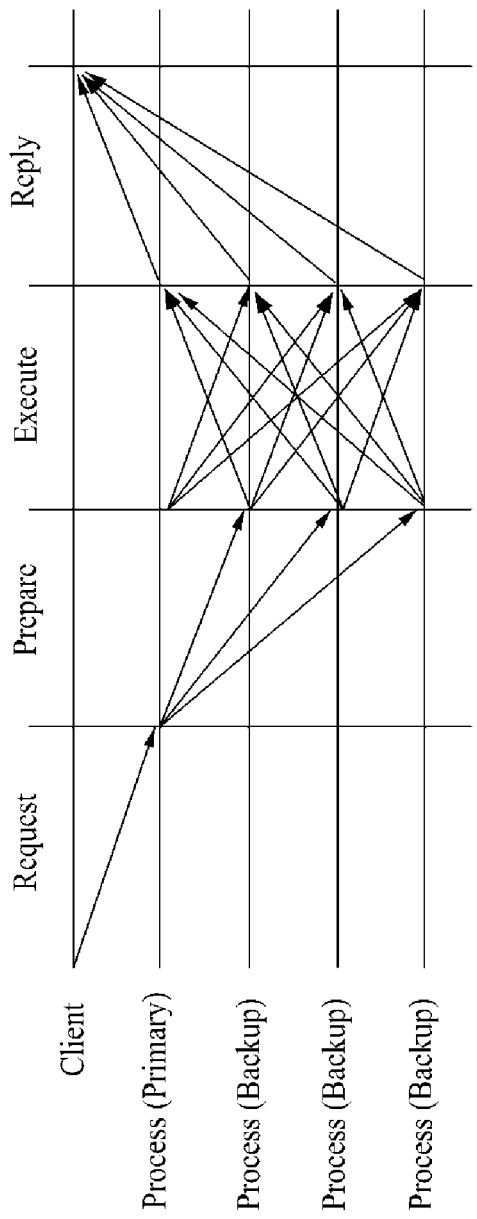
FIG. 2 is a diagram for describing two message communication phases of an agreement protocol in an embodiment.

FIG. 2 is a diagram for describing two message communication phases of an agreement protocol in an embodiment.

When a client c transmits a REQUEST message m=<REQUEST, o, t, c>$\sigma_c$ to the primary p, one round of the agreement protocol may be started. In the REQUEST message, o indicates the operation that is requested by the client, t indicates a timestamp, c indicates the identifier of the client, and $\sigma_c$ indicates the electronic signature of the client. Subsequently, processes may execute a two-phase agreement protocol including a Prepare phase and an Execute phase.

In the Prepare phase, the primary p may transmit a PREPARE message «PREPARE, v, n, H, Hash(m), p>$\sigma_p$, m> to all processes by using a client request message stored in reservedPreparep or a new client request message m if such a client request message is not present. The primary p may set its own current state currentState p as a PREPARED state. In this case, in the PREPARE message, v is the current view value currentView p of the primary p. n is the sequence number assigned by the primary p to the client request m, which is calculated as executeIndexp+1. H is a value of an execution history (executeHistory) that will be obtained when consensus is successful, and is calculated as H=Hash (executeHistory$_p$[executeIndex$_p$], m). Hash(m) indicates the hash value of m, and $\sigma_p$ indicates the electronic signature of the primary. If a client request to be processed is not present, the primary p will transmit the PREPARE message by using a NULL REQUEST message m=<NULL-REQUEST, o$_{null}$, t, p>$\sigma_p$. The NULL REQUEST message plays a heart beat role for preventing an unnecessary view change. Each process i that has received the PREPARE message from the primary p may set currentState$_i$=PREPARED if the process has never executed m before and all conditions v=currentView$_i$, n=executeIndex$_i$+1, H=Hash(executeHistory$_i$[executeIndex$_i$], m) are satisfied.

In the Execute phase, each process i the current state of which is PREPARED (currentState$_i$=PREPARED) may transmit an EXECUTE message <EXECUTE, v, n, H, Hash(m), i>$\sigma_i$ to other processes. If each process i the current state of which is PREPARED (currentState$_i$=PREPARED) receives matching EXECUTE messages from (2f+1) or more processes including the process i, the process may perform a series of the following tasks.

Each process i may record, on undoLog$_i$, pieces of information necessary for rollback. Each process i may obtain a result by executing the client request m, and may transmit the obtained result to the client as a REPLY message <REPLY, v, t, c, result>σ$_i$. Each process i may increase executeIndex$_i$ by +1, may set executeLog$_i$[executeIndex$_i$] as m, may set executeHistory$_i$[n]=Hash(executeHistory$_i$[n−1], m), may set currentState$_i$=READY, and may restart the agreement timer T$_{agreement,i}$ by initializing the agreement timer to Δ$_1$.

Additionally, in the Execute phase, if an estimated cost of rollback is too high or rollback is impossible for some reason, the process may defer the execution of a client request and the transmission of the REPLY message for the client request. In this case, each process i sets deferredExecution$_i$=true and executes the client request in the Execute phase of a next round. This is called deferred execution. Accordingly, if deferredExecution$_i$=true has been set when each process i enters the Execute phase, the process needs to first execute the deferred client request that has been deferred in the previous round before executing a new client request in the current round.

The client may commit a result when receiving (2f+1) or more REPLY messages containing the same execution result with respect to the REQUEST message that has been sent by the client. If the client does not receive (2f+1) or more REPLY messages containing the same execution result within a given time, the client may transmit the REQUEST message m to all processes. Each process i may receive the REQUEST message m transmitted by the client. If each process i has already transmitted the REPLY message with respect to the REQUEST message m, the process may retransmit the same REPLY message to the client. If each process i has not transmitted the REPLY message with respect to the REQUEST message m, the process may relay the REQUEST message m to the primary, and may restart the agreement timer T$_{agreement,i}$ by initializing the agreement timer to Δ$_1$.

Figure 3:
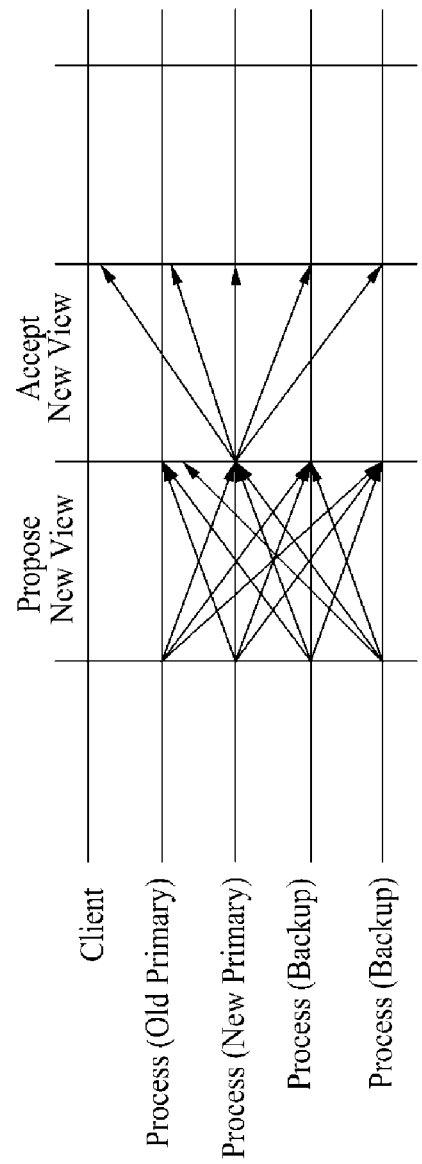
FIG. 3 is a diagram for describing a message communication phase of a view change protocol in an embodiment.

FIG. 3 is a diagram for describing two message communication phases of a view change protocol in an embodiment.

Each process i may start the view change protocol if the primary is suspicious of having a Byzantine fault. Each process i may use the agreement timer T$_{agreement,i}$ in order to determine a Byzantine fault of the primary. If the timer T$_{agreement,i}$ expires before each process i executes a client request, the process may start the view change protocol. The view change protocol may operate in two phases of a Propose new view and an Accept new view.

In the Propose new view phase, each process i may set its current state as VIEW-CHANGING (currentState, =VIEW-CHANGING), may transmit a Propose new view (PROPOSE-NEW-VIEW) message <<PROPOSE-NEW-VIEW, v$_{new}$, n$_{last}$, n$_{prepared}$, Hash(M$_{PREPARE}$), i>σ$_i$, EC$_{last}$, M$_{PREPARE}$> to other processes, and may start the view-change timer T$_{view-change,i}$ by initializing the view-change timer. In this case, v$_{new}$ indicates a new view value, mast indicates executeIndex$_i$, n$_{prepared}$ indicates a sequence number proposed in an accepted PREPARE message M$_{PREPARE}$ that has been most recently received, Hash(M$_{PREPARE}$) indicates the hash value of the PREPARE message M$_{PREPARE}$ that has been most recently received when n$_{prepared}$=n$_{last}$+1 or null when n$_{prepared}$=n$_{last}$, and EC$_{last}$ indicates an execution certificate for certifying the validity of n$_{last}$ and indicates a set of (2f+1) matching EXECUTE messages that have been received by the process i.

In the Accept new view phase, a process (new primary) p' corresponding to the primary of a new view v$_{new}$ may perform a series of the following tasks when receiving PROPOSE-NEW-VIEW messages having the same v$_{new}$ from (2f+1) processes including the process p'.

The process p' corresponding to the primary of the new view v$_{new}$ may transmit an ACCEPT-NEW-VIEW message <<ACCEPT-NEW-VIEW, v$_{new}$, n$_{new}$, p'>σ$_{p'}$, VCC$_{new}$, EC$_{max}$> message to other processes and a client. In this case, n$_{new}$ is a sequence number that will be first agreed in the new view v$_{new}$ and is set as n$_{new}$=1+max(n$_{last}$) where max(n$_{last}$) is the greatest mast among the received (2f+1) PROPOSE-NEW-VIEW messages. VCC$_{new}$ is a view change certificate for certifying the validity of a view change, and indicates a set of (2f+1) PROPOSE-NEW-VIEW messages from which EC$_{last}$ and M$_{PREPARE}$ have been removed. EC max indicates EC$_{last}$ having the greatest mast among the received (2f+1) PROPOSE-NEW-VIEW messages.

Furthermore, the process p' corresponding to the primary of the new view v$_{new}$ finds and retrieves a client request message m that has the greatest n$_{prepared}$ from the received (2f+1) PROPOSE-NEW-VIEW messages, and may set reservedPrepare$_i$=m when the greatest n$_{prepared}$ is equal to n$_{new}$, and may set reservedPrepare$_i$=null when the greatest n$_{prepared}$ is smaller than n$_{new}$. If there are two or more client request messages that have the same greatest n$_{prepared}$ in the received (2f+1) PROPOSE-NEW-VIEW message, m may be arbitrarily selected.

When receiving the ACCEPT-NEW-VIEW message from the new primary p', each process i may perform a series of the following tasks. If v$_{new}$>currentView$_i$, each process i may set currentView$_i$=v$_{new}$, may stop the view-change timer T$_{view-change,i}$, may restart the agreement timer T$_{agreement,i}$ by initializing the agreement timer to Δ$_1$, and may set its current state as currentState$_i$=READY.

Furthermore, each process i may perform a rollback by undoing the most recent execution of a client request when discovering state inconsistency. Each process i may discover state inconsistency by examining EXECUTE or ACCEPT-NEW-VIEW messages it receives.

Upon receiving (2f+1) or more matching EXECUTE messages <EXECUTE, v, n, H, Hash(m), j>σ$_j$, each process i can detect that state inconsistency has occurred when n=executeIndex$_i$+1 and H Hash(executeHistory$_i$[executeIndex$_i$], m) or when n=executeIndex$_i$.

Upon receiving a valid ACCEPT VIEW CHANGE message <<ACCEPT-NEW-VIEW, v$_{new}$, n$_{new}$, p'>σ$_{p'}$, VCC$_{new}$, EC$_{max}$>, each process i can detect that state inconsistency has occurred when n$_{new}$=executeIndex$_i$.

Figure 4:
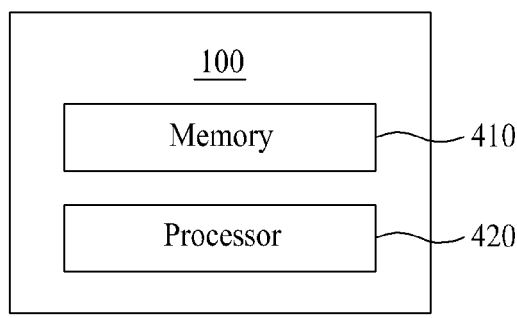
FIG. 4 is a block diagram for describing a construction of a process that participates as a state machine in consensus in an embodiment.

FIG. 4 is a block diagram for describing a construction of a process that participates as a state machine in consensus in an embodiment.

The memory 410 may include all of volatile, nonvolatile, separation type, and non-separation type media implemented by using an arbitrary method or technology, for storing information, such as a computer-readable instruction, a data structure, a program module, or other data, and stores instructions or data related to at least another component of the process 100.

The processor 420 may include one or more of a central processing unit, an application processor, or a communication processor. For example, the processor 420 may execute an operation or data processing relating to control and/or communication of at least another component of the process 100.

FIG. 5 to FIG. 11 are flowcharts for describing a consensus method in an embodiment.

Figure 5:
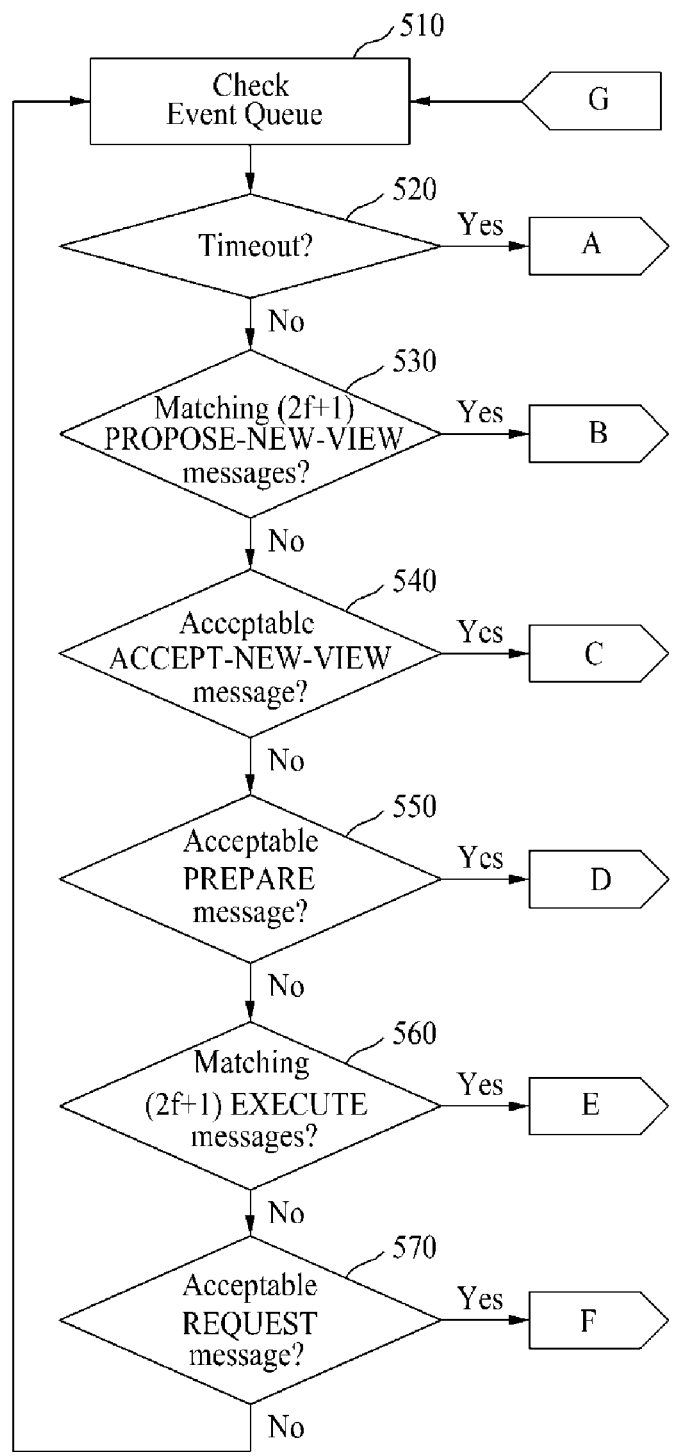
FIG. 5 is a flowchart for describing a consensus method in an embodiment.

In step 510 of FIG. 5, a process i may find an acceptable event occurrence and check a series of conditions. In condition 520, if it finds a timeout event, then it executes the flowchart in FIG. 6. In condition 530, if it finds matching (2f+1) PROPOSE-NEW-VIEW messages, then it executes the flowchart in FIG. 7. In condition 540, if it finds an acceptable ACCEPT-NEW-VIEW message, then it executes the flowchart in FIG. 8. In condition 550, if it finds matching an acceptable PREPARE message, then it executes the flowchart in FIG. 9. In condition 560, if it finds matching (2f+1) EXECUTE messages, then it executes the flowchart in FIG. 10. In condition 570, if it finds an acceptable REQUEST message, then it executes the flowchart in FIG. 11.

Figure 6:
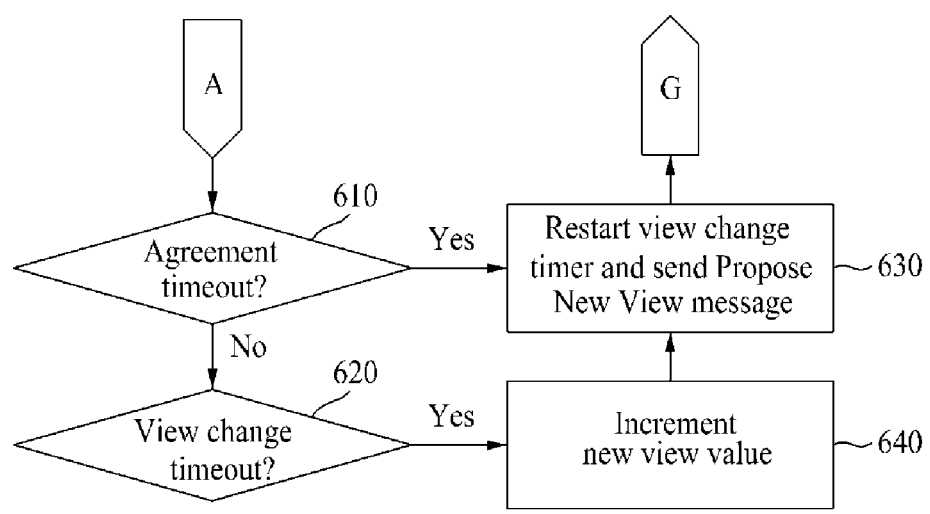
FIG. 6 is a flowchart for describing a consensus method in an embodiment.

In condition 610 of FIG. 6, if the timeout was caused by the agreement timer, the process performs step 630. The process i sets its current state as VIEW-CHANGING ($currentState_i$=VIEW-CHANGING), transmits a Propose new view (PROPOSE-NEW-VIEW) message <<PROPOSE-NEW-VIEW, $v_{new}$, mast, $n_{prepared}$, Hash($M_{PREPARE}$), i>$\sigma_i$, $EC_{last}$, $M_{PREPARE}$> to other processes, and starts a view-change timer $T_{view-change,i}$ by initializing it as $\Delta 2$.

In condition 620 of FIG. 6, if the timeout was caused by the view change timer, the process performs step 640. The process may increase a new view value by 1 and increase a timer value twice the previous value.

Figure 7:
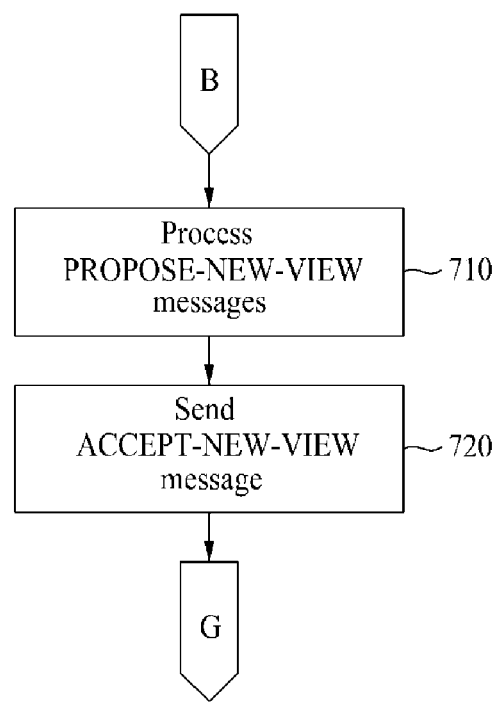
FIG. 7 is a flowchart for describing a consensus method in an embodiment.

In step 710 of FIG. 7, if the process i has found matching (2f+1) PROPOSE-NEW-VIEW messages <<PROPOSE-NEW-VIEW, $v_{new}$, mast, $n_{prepared}$, Hash($M_{PREPARE}$), i>$\sigma_i$, $EC_{last}$, $M_{PREPARE}$> that designate the process i as a new primary, it finds and retrieves a client request message m that has the greatest $n_{prepared}$ from the received (2f+1) PROPOSE-NEW-VIEW messages, and sets reservedPrepare$_i$=m when the greatest $n_{prepared}$ is equal to $n_{new}$, and sets reservedPrepare$_i$=null when the greatest $n_{prepared}$ is smaller than $n_{new}$. If there are two or more client request messages that have the same greatest $n_{prepared}$ in the received (2f+1) PROPOSE-NEW-VIEW messages, m may be arbitrarily chosen.

In step 720 of FIG. 7, the process transmits an ACCEPT-NEW-VIEW message <<ACCEPT-NEW-VIEW, $v_{new}$, $n_{new}$, p'>$\sigma_{p'}$, $VCC_{new}$, $EC_{max}$> message to other processes and a client.

Figure 8:
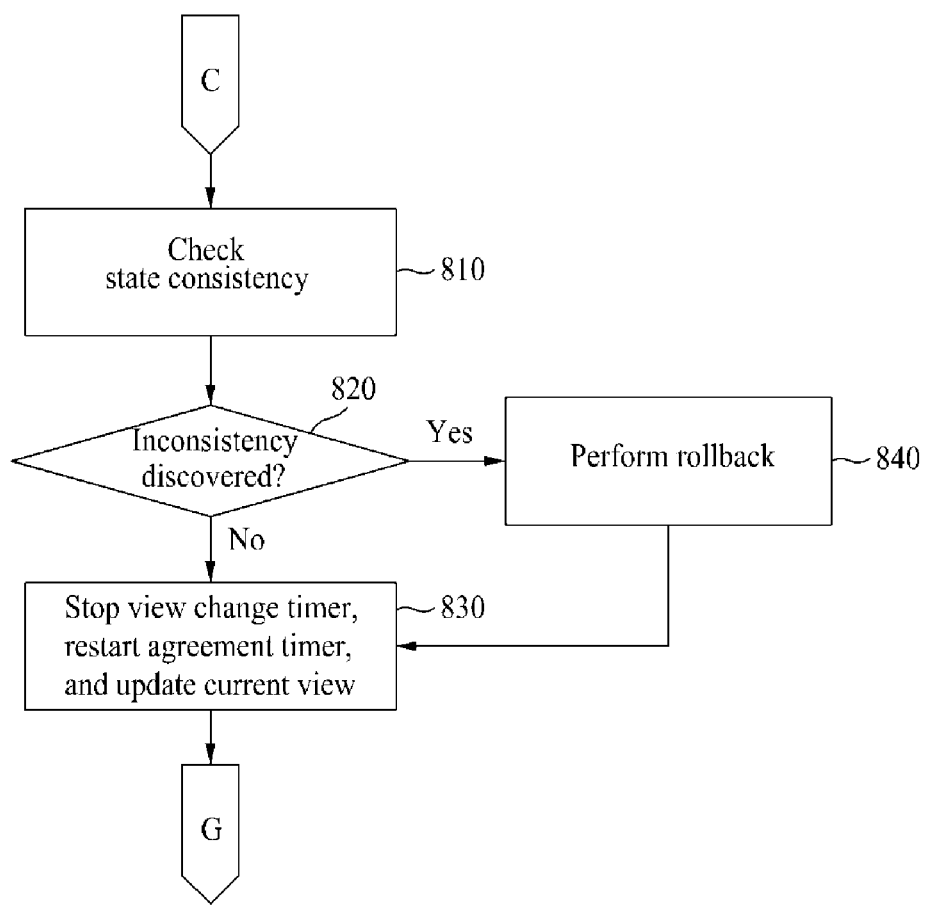
FIG. 8 is a flowchart for describing a consensus method in an embodiment.

In step 810 of FIG. 8, if the process i has found an <<ACCEPT-NEW-VIEW, $v_{new}$, $n_{new}$, p'>$\sigma_{p'}$, $VCC_{new}$, $EC_{max}$> message, it examines the message to see if its state is consistent with other non-faulty processes. In step 840, if the process discovers state inconsistency, it performs a rollback by undoing the most recent execution of a client request.

In step 830 of FIG. 8, the process i sets currentView$_i$=$v_{new}$, stops the view-change timer $T_{new-change,i}$, restarts the agreement timer $T_{agreement,i}$ by initializing the agreement timer to $\Delta_1$, and sets its current state as currentState$_i$=READY.

Figure 9:
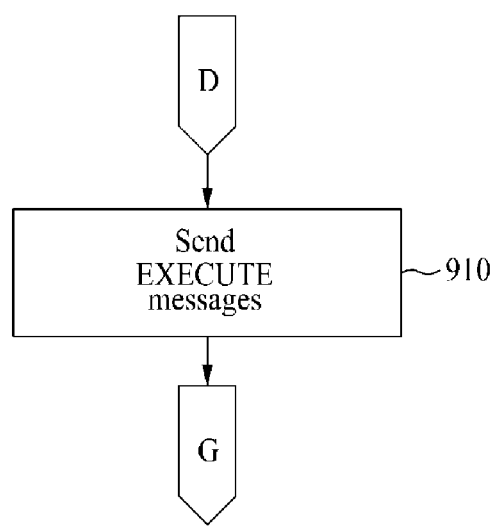
FIG. 9 is a flowchart for describing a consensus method in an embodiment.

In step 910 of FIG. 9, if the process i has found an acceptable PREPARE message <<PREPARE, v, n, H, Hash (m), p>$\sigma_p$, m>, it sets currentState, =PREPARED and transmit an EXECUTE message <EXECUTE, v, n, H, Hash(m), i>$\sigma_i$ to other processes.

Figure 10:
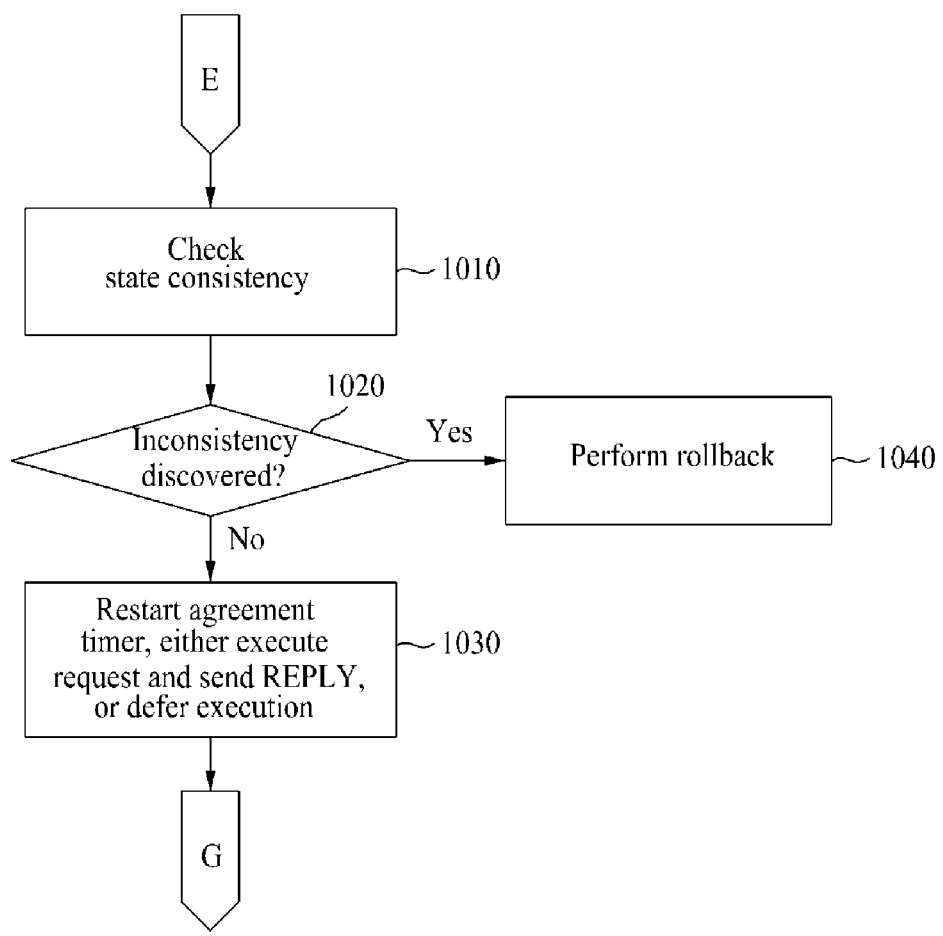
FIG. 10 is a flowchart for describing a consensus method in an embodiment.

In step 1010 of FIG. 10, if the process i has found matching (2f+1) EXECUTE messages <EXECUTE, v, n, H, Hash(m), i>, it examines the messages to see if its state is consistent with other non-faulty processes. In step 1040, if the process discovers state inconsistency, it performs a rollback by undoing the most recent execution of a client request.

In step 1010 of FIG. 10, the process increases executeIndex$_i$ by +1, sets executeLog$_i$[executeIndex$_i$] as m, sets executeHistory$_i$[n]=Hash(executeHistory$_i$[n−1], m), sets currentState$_i$=READY, and restarts the agreement timer $T_{agreement,i}$ by initializing the agreement timer to $\Delta_1$. If an estimated cost of rollback is neither too high nor rollback is impossible for some reason, the process may obtain a result by executing the client request m, and may transmit the obtained result to the client as a REPLY message <REPLY, v, t, c, i, result>$\sigma_i$. Otherwise, the process may defer the execution of a client request and the transmission of the REPLY message for the client request.

Figure 11:
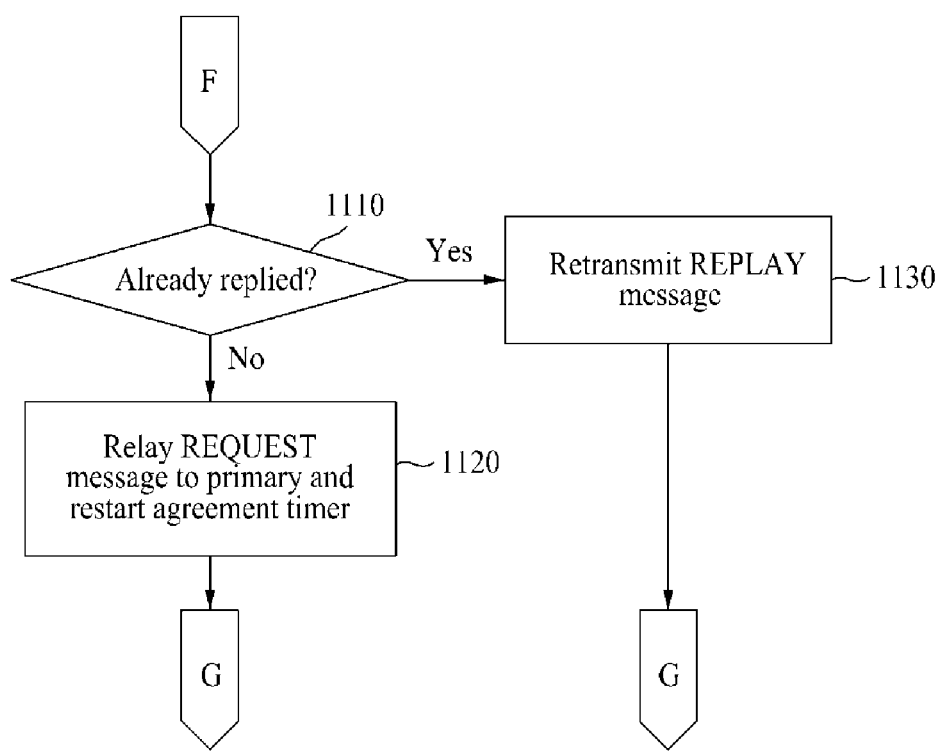
FIG. 11 is a flowchart for describing a consensus method in an embodiment.

In condition 1110 of FIG. 11, if the process i has already transmitted the REPLY message with respect to the REQUEST message, the process may retransmit the same REPLY message to the client as in step 1130. If the process i has not transmitted the REPLY message with respect to the REQUEST message m, the process relays the REQUEST message m to the primary, and may restart the agreement timer $T_{agreement,i}$ by initializing the agreement timer to $\Delta_1$ as in step 1120.

According to an embodiment, since consensus may be reached in two communication phases, an improved processing speed and throughput can be provided compared to the existing Practical Byzantine Fault Tolerance (PBFT) algorithm that requires three communication phases.

According to an embodiment, state inconsistency between processes can be bounded and detected without the help of a client, dependency of the existing Zyzzyva algorithm on a client can be solved by introducing execution histories into inter-process communication messages, and a cost attributable to state inconsistency can be improved.

According to an embodiment, stable performance can be provided compared to Zyzzyva because processes always operate in two communication phases regardless of a Byzantine fault and a network delay. Furthermore, processes can autonomously detect state inconsistency without the intervention of a client. Particularly, although state inconsistency occurs, the state inconsistency occurs with respect to only one latest client request that has been executed by a process. Accordingly, it may be said that a cost caused due to state inconsistency is very low compared to Zyzzyva.

Furthermore, according to an embodiment, in order to minimize state inconsistency, a new primary uses a speculative carryover by using a PREPARE message that is included in a PROPOSE-NEW-VIEW message received by the new primary. If all the PREPARE messages included in the PROPOSE-NEW-VIEW message received by the new primary are the same, state inconsistency can be prevented by processing the PREPARE message in the first round of the new view. If two or more different PREPARE messages are discovered, state inconsistency may occur or may not occur depending on the primary's choice. This occurs only if the two or more inconsistent PREPARE messages including a valid electronic signature of the primary have to be transmitted to processes in a situation in which a system operates asynchronously. For example, if a Byzantine primary transmits two or more inconsistent PREPARE messages with respect to the same sequence number and other Byzantine processes cooperate with the Byzantine primary, state inconsistency may occur. Since such collusion is unusual, it is very unlikely that state inconsistency may occur. Accordingly, a state inconsistency phenomenon can be very effectively reduced if the method is used.

Furthermore, according to an embodiment, means for previously preventing rollback attributable to state inconsistency can also be provided through deferred execution. Since the execution history executeHistory is used, to enter the Execute phase in a current round means that the execution that was performed in a previous round reaches the final consensus state. Accordingly, if a task deferred in the previous round is performed in the Execute phase of a new round, a situation in which rollback has to be subsequently performed never occurs.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, a virtual machine, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and recorded on a computer-readable recording medium. The computer-readable recording medium may include a program instruction, a data file, and a data structure alone or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as CD-ROM and a DVD, magneto-optical media such as a floptical disk, and hardware devices specially configured to store and execute a program instruction, such as ROM, RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereto.

Accordingly, other implementations, other embodiments, and the equivalents of the claims fall within the scope of the claims.

The embodiments of the disclosure in which an exclusive property or privilege is claimed are defined as follows:

1. A consensus method which is performed by a consensus system, comprising:
performing, by all of normal processes, consensus for a sequence number proposed by a process designated to be primary with respect to a client request according to an agreement protocol; and
replacing the primary when the primary is suspicious of having a Byzantine fault according to a view change protocol,
wherein replacing the primary according to the view change protocol comprises using the view change protocol comprising a Propose new view phase and an Accept New View phase, when an agreement timer expires before the client request is executed through the consensus.

2. The consensus method of claim 1, wherein performing the consensus according to the agreement protocol comprises:
a Prepare phase of transmitting, by the primary, a PREPARE message to the processes and processing the PREPARE message; and
an Execute phase of exchanging and processing, by each of the processes, EXECUTE messages.

3. The consensus method of claim 2, wherein performing the consensus according to the agreement protocol comprises:
generating, by the primary, the PREPARE message by using a client request message when a reserved client request message is present while executing the view change protocol,
generating, by the primary, the PREPARE message by using another request message received from a client if no client request has been reserved during a view change, and
generating, by the primary, the PREPARE message by using a null request message if there are no reserved client requests and no new client requests.

4. The consensus method of claim 1, wherein:
replacing the primary according to the view change protocol comprises setting a current state of each process as VIEW-CHANGING state, transmitting a PROPOSE-NEW-VIEW message to other processes, and starting a view-change timer by initializing the view-change timer, and
the PROPOSE-NEW-VIEW message comprises a new view value to designate a new primary, a sequence number value of a client request that has been finally executed and replied, and a valid PREPARE message that has been finally received.

5. The consensus method of claim 1, wherein replacing the primary according to the view change protocol comprises receiving, by a process corresponding to a new primary of a new view, PROPOSE-NEW-VIEW messages having an identical new view value from (2f+1) or more processes including itself.

6. The consensus method of claim 5, wherein replacing the primary according to the view change protocol comprises:
   searching, by the process corresponding to the new primary of the new view, received (2f+1) or more PROPOSE-NEW-VIEW messages for a maximum value of a sequence number of a client request that has been finally executed and replied by processes when receiving the (2f+1) or more PROPOSE-NEW-VIEW messages having an identical new view value,
   determining the searched maximum value as a sequence number that is to be started in the new view and including a value in an ACCEPT-NEW-VIEW message,
   transmitting the ACCEPT-NEW-VIEW message to other processes and a client,
   searching the received (2f+1) or more PROPOSE-NEW-VIEW messages for a PREPARE message a sequence number of which is a maximum value,
   setting a client request message that needs to be processed by the process corresponding to the new primary of the new view right after a view change as a client request message m included in the searched PREPARE message when a maximum value of a sequence number of the searched PREPARE message is identical with the sequence number that is to be started in the new view, and
   setting, as null, the client request message that needs to be processed by the process corresponding to the new primary of the new view right after the view change when the maximum value of the sequence number of the searched PREPARE message is not identical with the sequence number that is to be started in the new view.

7. The consensus method of claim 5, wherein replacing the primary according to the view change protocol comprises:
   setting, by each process, a current state of each process as a new view value when receiving the ACCEPT-NEW-VIEW message from the process corresponding to the new primary of the new view,
   stopping a view-change timer,
   restarting the agreement timer by initializing the agreement timer to $\Delta_1$, and
   setting the current state of each process as a READY state.

8. The consensus method of claim 1, wherein performing the consensus according to the agreement protocol and replacing the primary according to the view change protocol comprise a first client request that had been executed in a latest round when state inconsistency is discovered from each process by undoing the first client request.

9. The consensus method of claim 8, wherein performing the consensus according to the agreement protocol comprises:
   identifying, by the each process, (2f+1) or more agreed EXECUTE messages, and
   performing a rollback by determining that the state inconsistency has occurred when information included in an identified EXECUTE message is not identical with a sequence number of the first client request in relation to the process.

10. The consensus method of claim 8, wherein replacing the primary according to the view change protocol comprises performing, by the each process, a rollback by determining that the state inconsistency has occurred when a new sequence number value is identical with a sequence number value of the first client request in relation to the process when receiving a valid ACCEPT VIEW CHANGE message.

11. A consensus method which is performed by a consensus system, comprising:
   performing, by all of normal processes, consensus for a sequence number proposed by a process designated to be primary with respect to a client request according to an agreement protocol; and
   replacing the primary when the primary is suspicious of having a Byzantine fault according to a view change protocol,
   wherein performing the consensus according to the agreement protocol comprises:
   a Prepare phase of transmitting, by the primary, a PREPARE message to the processes and processing the PREPARE message;
   an Execute phase of exchanging and processing, by each of the processes, EXECUTE messages;
   transmitting, by the primary, the PREPARE message generated by using a client request message m to a total of (3f+1) processes; and
   setting, by all non-faulty processes including the primary, their current state as PREPARED state.

12. The consensus method of claim 11, wherein performing the consensus according to the agreement protocol comprises:
   transmitting an EXECUTE message from each process whose current state is PREPARED to other processes, and
   receiving (2f+1) or more matching EXECUTE messages from other processes whose current state is PREPARED.

13. The consensus method of claim 12, wherein performing the consensus according to the agreement protocol comprises:
   recording, by each process that has received matching EXECUTE messages from (2f+1) or more processes including itself, pieces of information necessary for rollback is recorded,
   obtaining a result by executing the client request message m,
   transmitting a REPLY message comprising the obtained result to a client,
   increasing a sequence number of a new client request to be subsequently processed by +1,
   adding m to a list of client request messages that have been processed so far through consensus,
   updating a summarized history of client requests that have been processed so far through consensus,
   setting current states of the process as READY, and restarting an agreement timer by initializing the agreement timer to $\Delta_1$.

14. The consensus method of claim 13, wherein performing consensus according to the agreement protocol comprises:
   committing, by the client, the result when receiving (2f+1) or more REPLY messages comprising an identical result for a task for the client request,
   transmitting, by the client, a REQUEST message m to processes when the client does not receive the (2f+1) or more REPLY messages comprising a same result within a given time, retransmitting, by each process, the REPLY message to the client when receiving the REQUEST message m from the client, transferring, by each process, the REQUEST message m to the primary when a request has not been executed by the process, and restarting, by each process, the agreement timer by initializing the agreement timer to $\Delta 1$.

15. The consensus method of claim 12, wherein performing the consensus according to the agreement protocol comprises deferring execution of a task for the client request and omitting the transmission of the REPLY message, when a rollback is impossible or a rollback cost is determined to be a preset reference or more.

16. A consensus method which is performed by a consensus system, comprising:

performing, by all of normal processes, consensus for a sequence number proposed by a process designated to be primary with respect to a client request according to an agreement protocol; and replacing the primary when the primary is suspicious of having a Byzantine fault according to a view change protocol, wherein performing the consensus according to the agreement protocol comprises:

a Prepare phase of transmitting, by the primary, a PREPARE message to the processes and processing the PREPARE message;

an Execute phase of exchanging and processing, by each of the processes, EXECUTE messages;

generating, by the primary, the PREPARE message by using a client request message when a reserved client request message is present while executing the view change protocol;

generating, by the primary, the PREPARE message by using another request message received from a client if no client request has been reserved during a view change; and generating, by the primary, the PREPARE message by using a null request message if there are no reserved client requests and no new client requests.

* * * * *